(12) United States Patent
Prickel et al.

(10) Patent No.: US 9,706,701 B2
(45) Date of Patent: Jul. 18, 2017

(54) AGRICULTURAL IMPLEMENT HAVING POWER ASSIST WING WHEELS

(71) Applicant: CNH Industrial America LLC, New Holland, PA (US)

(72) Inventors: Marvin A. Prickel, Homer Glen, IL (US); Brian J. Anderson, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 126 days.

(21) Appl. No.: 14/547,657

(22) Filed: Nov. 19, 2014

(65) Prior Publication Data

US 2016/0135356 A1    May 19, 2016

(51) Int. Cl.
*A01B 73/06* (2006.01)
*A01C 7/20* (2006.01)

(52) U.S. Cl.
CPC ............ *A01B 73/065* (2013.01); *A01C 7/208* (2013.01)

(58) Field of Classification Search
CPC ....... A01B 73/00; A01B 73/06; A01B 73/065; A01B 73/067
See application file for complete search history.

(56) References Cited

U.S. PATENT DOCUMENTS

| 2,769,384 A | 11/1956 | Selzer |
| 4,088,346 A | 5/1978 | Schreiner et al. |
| 4,319,643 A | 3/1982 | Carter et al. |
| 4,504,076 A | 3/1985 | Bedney |
| 5,947,855 A | 9/1999 | Weiss |
| 6,192,994 B1 | 2/2001 | Friggstad et al. |
| 6,318,477 B1 | 11/2001 | Bettin |
| 6,902,010 B2 | 6/2005 | Shoup |

(Continued)

FOREIGN PATENT DOCUMENTS

GB    1578857    11/1980

OTHER PUBLICATIONS

JohnDeereLiftAssist; Straight lift-assist wheels; Lift-assist systems permit the use of larger planters on smaller tractors by providing additional lifting capacity; Jun. 29, 2010; http://salesmanual.deere.com/sales/salesmanual/en_NA/seeding/attachments/frame/planter . . . —(3) pages.

*Primary Examiner* — Matthew D Troutman
(74) *Attorney, Agent, or Firm* — Rebecca L. Henkel; Rickard K. DeMille

(57) ABSTRACT

An agricultural planter which provides an improved method for extending and retracting the wing boom and which has improved maneuverability is disclosed. A drive member is provided that drives one or more of the wing wheels on the agricultural planter. The drive member may be, for example, a hydraulic motor or an electric motor. When a wing boom is extended or retracted between the transport position and the working position, a controller generates a command signal to the drive member to drive one or more of the wing wheels forward or reverse, thereby assisting the wing boom in retracting or extending the telescoping portion of the hitch assembly and in extending or retracting the booms. During operation, the controller may similarly generate a command to the drive member to drive one or more of the wing wheels either in forward or reverse according to the operation of the towing vehicle.

14 Claims, 9 Drawing Sheets

(56) References Cited

U.S. PATENT DOCUMENTS

| | | |
|---|---|---|
| 7,717,189 B2 | 5/2010 | Shoup et al. |
| 7,854,272 B2 | 12/2010 | Friggstad et al. |
| 8,141,652 B2 | 3/2012 | Poole et al. |
| 8,544,574 B2 * | 10/2013 | Fegley .................. A01B 69/006 180/14.1 |
| 9,037,346 B2 * | 5/2015 | Keys, II .................. B60D 1/248 701/1 |
| 2002/0095251 A1 * | 7/2002 | Oh ............................ B60T 7/20 701/70 |
| 2006/0090910 A1 * | 5/2006 | Houck .................. A01B 59/042 172/272 |
| 2011/0265699 A1 | 11/2011 | McCrea et al. |
| 2013/0032365 A1 | 2/2013 | Houck |
| 2013/0186657 A1 | 7/2013 | Kormann et al. |
| 2015/0150185 A1 * | 6/2015 | Houck .................. A01B 59/042 172/388 |
| 2016/0135357 A1 * | 5/2016 | Prickel .................. A01C 7/208 172/2 |

* cited by examiner

AGRICULTURAL IMPLEMENT HAVING POWER ASSIST WING WHEELS

FIELD OF THE INVENTION

The subject matter disclosed herein relates generally to agricultural implements with wing booms, and in particular, to a wing boom in which one or more wheels include a power assist system for improved handling of the wing boom.

BACKGROUND OF THE INVENTION

Agricultural planters are towed behind a tractor and generally consist of a hitch assembly, connected to the tractor, and a pair of wing booms, each wing boom coupled to the hitch assembly. The wing booms support a series of spaced row units that deposit seed, fertilizer or other granular material onto a planting surface, e.g., farm field. Because of the relatively large span of the wing booms, the planter frame typically includes a pair of draft links. Each draft link extends between the hitch assembly and one of the wing booms and is designed to add stability to the wing booms as the planter traverses the planting surface. In some planters, the wing booms are designed to fold forward against the hitch assembly. For such forward-folding planters, the wing booms will typically be folded forward when the planter is ready for transport. That is, a planter generally has a working position in which the wing booms are fully extended away from the hitch assembly and a transport position in which the wing booms are folded forward toward the hitch assembly. In the transport position, the width of the planter is greatly reduced which is advantageous for exiting the planting surface and for storage of the planter. Additionally, when being shipped, the planter will be placed in its transport position.

To expedite particulate matter deposition onto the planting surface, planter manufactures are adding length to the wing booms thereby allowing more row units to be mounted along the length of the wing booms. As a result, the length of the wing booms is becoming greater than the length of the hitch assembly. When the wing booms are retracted into the transport position, the outer ends of the wing booms may undesirably extend forward past the hitch of the towing vehicle, e.g., tractor. As such, large agricultural planters are typically equipped with a telescoping hitch assembly, rather than a fixed length, hitch assembly. More particularly, the hitch assembly includes a telescoping portion that increases the length of the hitch assembly as the wing booms are folded forward. The telescoping hitch assembly, therefore, provides clearance for the outer ends of the wing booms behind the tractor as the wing booms are retracted for transportation.

The draft links connected between the hitch assembly and the wing booms are typically hydraulic cylinders configured to extend and to retract, thereby causing the wing booms to move between the transport position and the working position. As the wing booms are folded forward, the draft links connected between the hitch assembly and the wing booms also cause the telescoping portion of the hitch assembly to extend to provide the aforementioned clearance for the wing booms. The required size of the hydraulic cylinder for the draft link is a function of several factors, such as the weight of the wing boom, the amount of extension required by the hitch assembly, and the location at which the draft link is connected to the wing boom. As the length of the wing booms is increased the weight of the wing boom increases, the amount of extension required by the hitch assembly increases, and the location at which the draft link is connected to the wing boom may change as well. Each of the factors contributes to an increase in the amount of force required to move the wing boom between the transport position and the working position and, therefore, to an increase in the size of the draft link.

Therefore, there is a need for an agricultural planter which provides an improved method for moving the wing boom between the transport position and the working position.

When the wing booms are extended, each boom acts as a lever arm with respect to the pivot point at which the boom is connected to the hitch assembly. If a wing wheel at the end of the boom encounters an obstacle, such as a rock, furrow, or the like, the force seen at the hitch assembly is multiplied by the length of the wing boom. With increasing lengths of the wing booms, the force that is required to be applied from the towing vehicle to the planter in order to overcome forces encountered at the ends of the wing booms is similarly increased. In addition, the additional length requires additional wing wheels to support the wing boom, and each wing wheel introduces additional forces to the hitch assembly such as additional rolling resistance or additional forces resulting from objects encountered in the field. The additional forces on the planter due to the increasing length of the wing boom require additional force applied to the planter from the towing vehicle and reduce maneuverability of the planter.

Therefore, there is also a need for an agricultural planter having improved maneuverability during operation.

SUMMARY OF THE INVENTION

The present invention provides an agricultural planter which provides an improved method for moving the wing boom between the transport position and the working position and which has improved maneuverability. A drive member is provided that provides a rotational force to one or more of the wing wheels on the agricultural planter. The drive member may be any suitable drive member including, but not limited to, a hydraulic motor, an electric motor, or a driveshaft mechanically linked, for example, to a power takeoff (PTO) from the to vehicle. A controller in the towing vehicle, on the agricultural planter, or a combination thereof is used to control operation of the drive member. When a wing boom is extended from the transport position to the working position, the controller generates a command signal to the drive member to drive the wing wheels in reverse, thereby assisting the end of each boom to traverse the arcuate path formed by the pivotal travel of each boom. The powered wing wheels, in assisting the booms to extend, in turn, assist the draft links in retracting the telescoping portion of the hitch while extending the booms. When a wing boom is retracted from the working position to the transport position, the controller generates a command signal to the drive member to drive the wing wheels forward, thereby assisting the end of each boom to traverse the arcuate path. The powered wing wheels, in assisting the booms to retract, in turn, assist the draft links in extending the telescoping portion of the hitch while retracting the booms. During operation, either in the transport position or in the working position, the controller may similarly generate a command to the drive member to drive the wing wheels either in forward or reverse according to the operation of the towing vehicle to assist in control of the agricultural planter.

According to one embodiment of the invention, an agricultural planter assembly, configured to be pulled along a surface by a towing vehicle, is disclosed. The agricultural planter assembly includes a hitch assembly having a first end, a second end, and a telescoping portion. The first end is configured to be located proximate to the towing vehicle, the second end is configured to be located distal from the towing vehicle, and the telescoping portion is movable between an extended position and a retracted position. At least one wing boom having a first end and a second end is pivotally connected to the hitch assembly at the first end and movable between a working position and a transport position. The agricultural planter assembly also includes at least one draft link and at least one wing wheel. Each draft link is connected between the hitch assembly and one of the wing booms, and each wing wheel is mounted proximate to the second end of each wing boom and configured to engage the surface on which it is being towed. A drive member is operatively coupled and provides a driving force to each wing wheel. The drive member provides the driving force when the wing boom is being moved between the working position and the transport position. The drive member may be a hydraulic motor, an electric motor, or, optionally, a mechanical coupling between the wing wheel and the towing vehicle.

When the drive member is a hydraulic motor, the agricultural planter assembly may include an auxiliary hydraulic pump configured to supply hydraulic fluid to the hydraulic motor. Optionally, the agricultural planter assembly may include a hydraulic coupling proximate the first end of the hitch assembly and configured to be connected to a corresponding hydraulic coupling on the towing vehicle, and a hydraulic line establishes a fluid flow path between the hydraulic coupling and the hydraulic motor.

When the drive member is an electric motor, the agricultural planter assembly further comprises a motor drive configured to receive a command signal from a controller on the towing vehicle and configured to control rotation of the electric motor responsive to the command signal.

When the drive member is a mechanical coupling between the wing wheel and the towing vehicle, the drive member may be a gear set operatively coupled to the wing wheel. The agricultural planter assembly may also include a drive train configured to engage a power takeoff from the towing vehicle and operatively coupled to the gear set.

According to another aspect of the invention, the agricultural planter assembly may also include at least one hydraulic cylinder connected between the hitch assembly and either the wing boom or the draft link. Each hydraulic cylinder is movable between a retracted position and an extended position and movement of the hydraulic cylinder between the retracted position and the extended position causes, at least in part, the wing boom to move between the working position and the transport position. The agricultural planter assembly may also include a controller configured to generate a first control signal for the hydraulic cylinder to move the hydraulic cylinder between the retracted position and the extended position and a second control signal to the drive member corresponding to a desired driving force. The controller is further configured to coordinate the first and second control signals such that the hydraulic cylinder and the drive member operate in tandem to move the wing boom between the working position and the transport position.

According to yet another aspect of the invention, the drive member receives a command signal from the towing vehicle to provide the driving force when the at least one wing boom is in the working position. The command signal may be a speed signal corresponding to a speed of the towing vehicle, and the agricultural planter assembly may include a speed sensor generating a signal corresponding to a speed of the wing wheel. The drive member generates the driving force such that the speed of the wing wheel matches the speed of the towing vehicle. The drive member may also be operable in two modes. In the first mode the drive member provides the desired driving force, and in the second mode, the wing wheel to which the drive member provides the desired driving force is allowed to freewheel.

According to another embodiment of the invention, an agricultural planter assembly, configured to be pulled along a surface by a towing vehicle, includes a hitch assembly, at least one elongated boom, at least one wing wheel, and a drive member. The hitch assembly includes a telescoping portion movable between an extended position and a retracted position. Each elongated boom assembly has a first end and a second end, where the first end is pivotally coupled to the hitch assembly and the elongated boom is movable between a working position and a transport position. Each wing wheel is mounted to the second end of an elongated boom and is configured to engage the surface. The drive member is operatively coupled and provides a driving force to at least one of the wing wheels. The agricultural planter assembly may also include at least one sensor configured to generate a signal corresponding to an operating parameter of either the towing vehicle or the agricultural planter and a controller configured to receive the signal from the at least one sensor. The controller may also generate a reference signal for the drive member, where the reference signal corresponds to a desired driving force.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which will be readily understood from the following description of the illustrated embodiment.

DETAILED DESCRIPTION

The various features and advantageous details of the subject matter disclosed herein are explained more fully with reference to the non-limiting embodiments described in detail in the following description.

Figure 1:
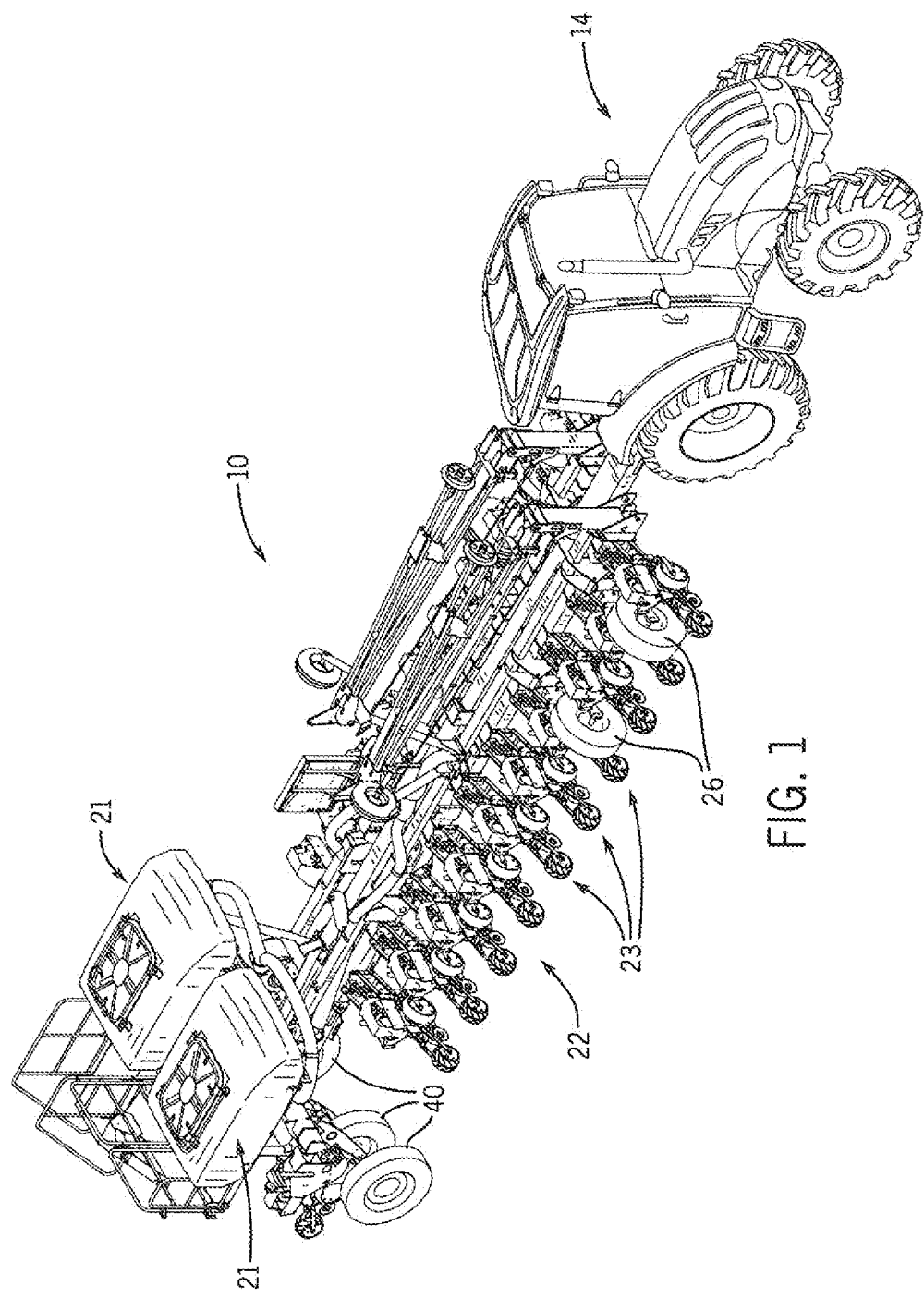
FIG. 1 is an exemplary environmental view of a planter incorporating powered wing wheels according to one embodiment of the invention in which the booms of the planter are in the transport position.
Figure 2:
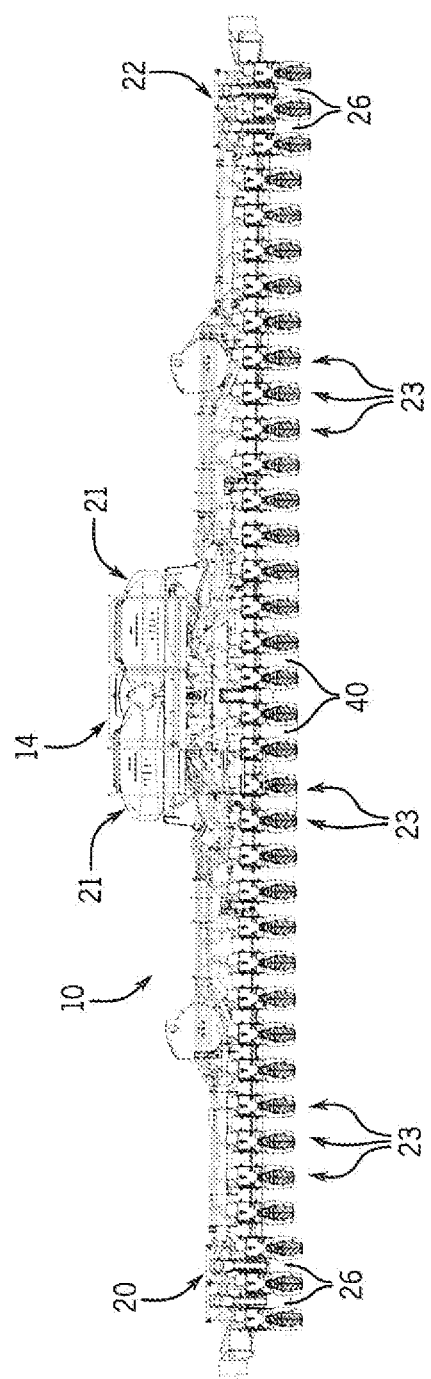
FIG. 2 is an exemplary environmental view of the planter of FIG. 1 in which the booms of the planter are in the working position.

Referring to FIGS. 1 and 2, the present invention is directed to an agricultural implement 10, such as a planter, carried by or otherwise coupled to a towing vehicle 14, such as a tractor. The planter 10 includes a, frame generally comprised of a hitch assembly 18 and a pair of wing booms 20, 22 that are connected to the hitch assembly 18. The hitch assembly 18 has a first end 11 proximate to and configured to engage the towing vehicle 14 and a second end 13 distal from the towing vehicle 14. The wing booms 20, 22 are connected to the hitch assembly 18 at a mount 24 in a manner that allows the wing booms 20, 22 to fold forward. The planter includes hoppers 21 which may be configured to carry seed and/or fertilizer. Row units 23 are mounted to the planter along each boom 20, 22 and along the frame behind each hopper 21. The associated cabling and hydraulics required for control and operation of the row units 23 are also mounted to the planter 10. It is contemplated that the planter 10 may be configured to have varying numbers of row units 23 and for distribution of varying product such as seed, fertilizer, insecticide, herbicide, and the like without deviating from the scope of the invention.

Figure 3:
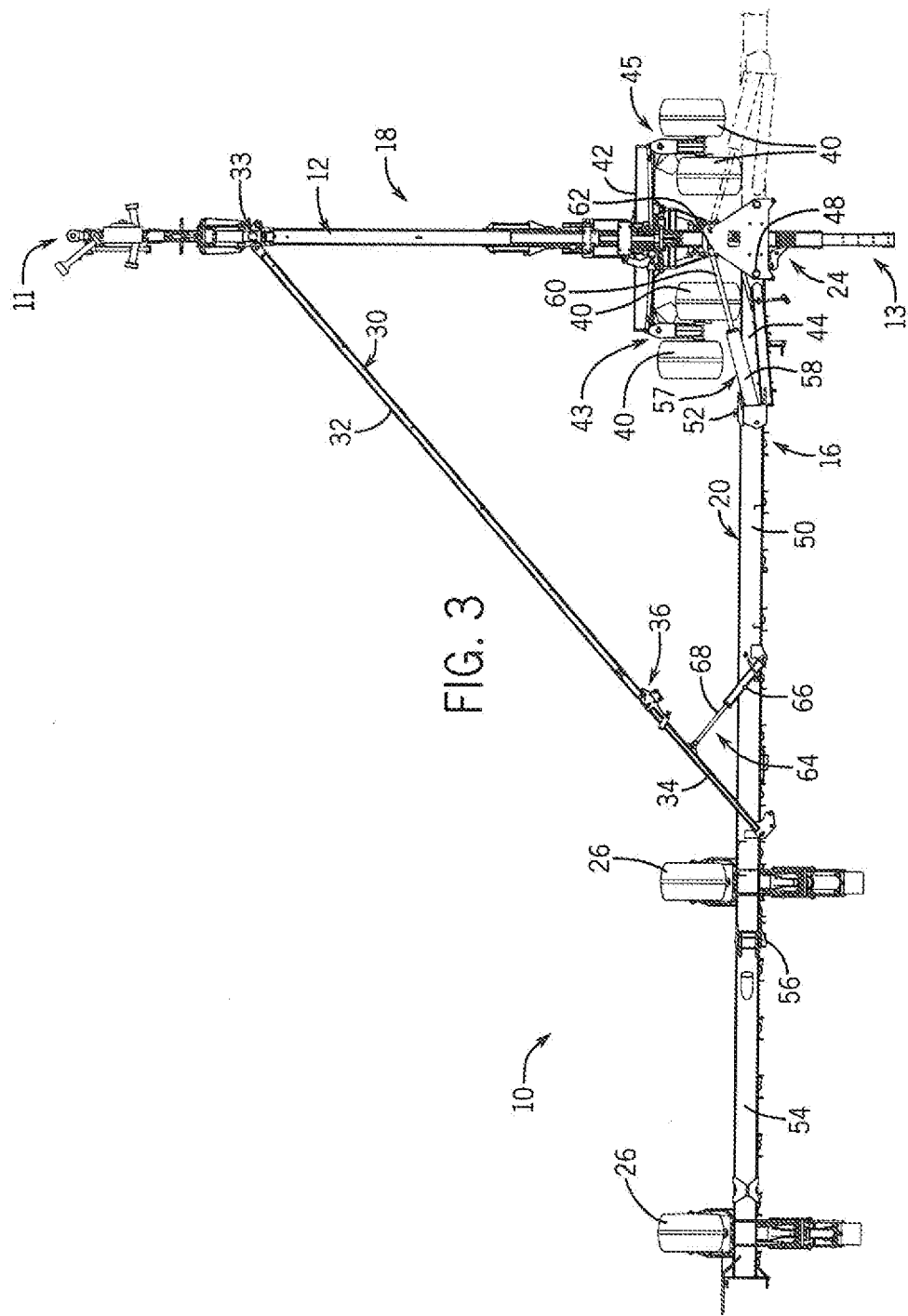
FIG. 3 is a partial top plan view of the planter of FIG. 1 illustrating the boom in the working position.
Figure 4:
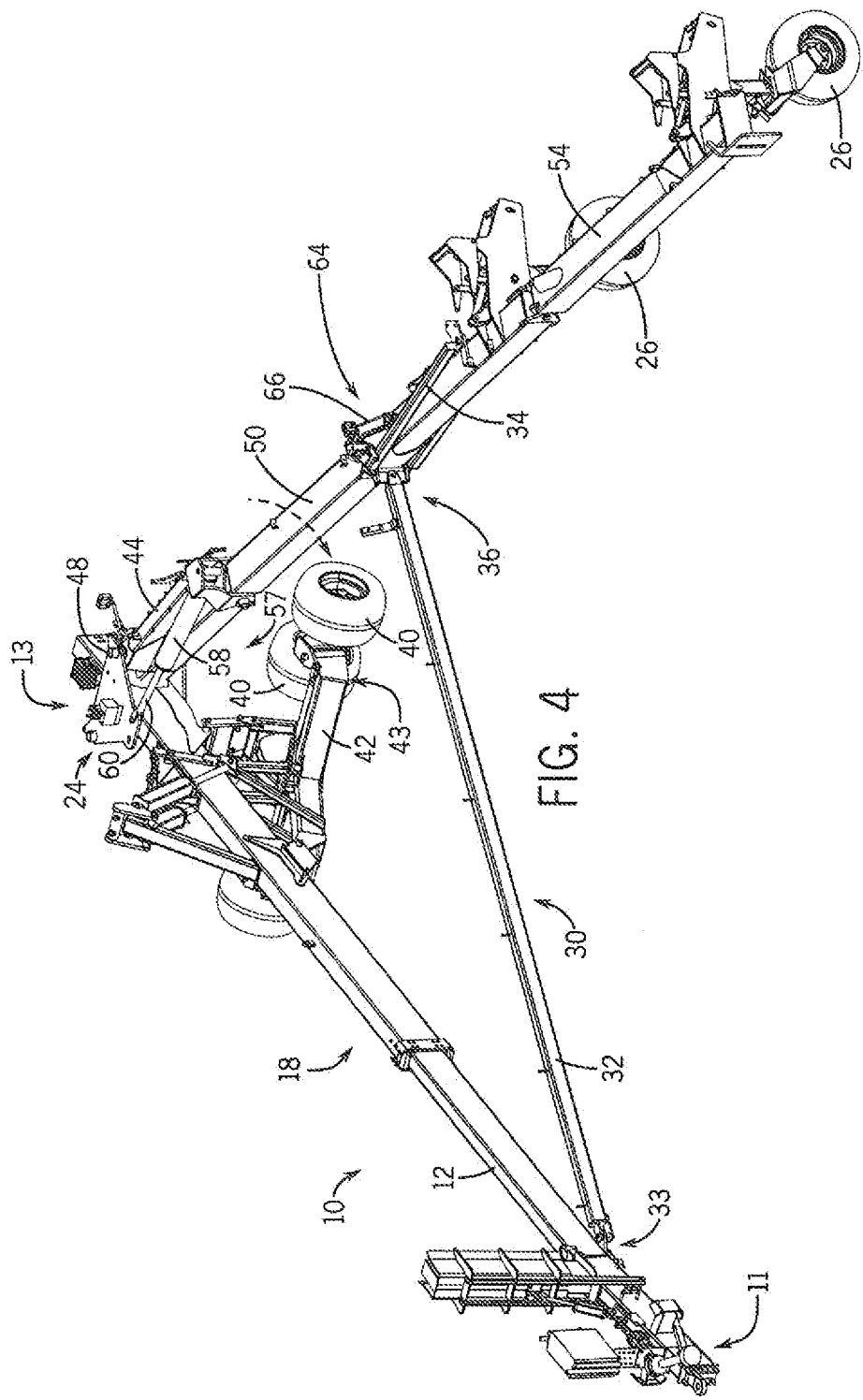
FIG. 4 is a partial top plan view of the planter of FIG. 1 illustrating the boom in a partially retracted position.

Turning next to FIGS. 3 and 4, a portion of a planter assembly is illustrated with the hoppers 21, row units 23, and the associated cabling and hydraulics removed. The hitch assembly 18 includes a telescoping portion 12 movable between an extended position and a retracted position. As will be appreciated by one skilled in the art, the hitch assembly 18 is generally aligned with and follows the direction of travel of the towing vehicle 14. The wing booms 20, 22 are oriented symmetrically about the hitch assembly 18, and, when facing a forward direction, wing boom 20 represents a left-side wing boom 20 and wing boom 22 represents a right-side wing boom. Because the wing booms 20, 22 are similarly constructed, the disclosure herein will be with respect to the left-side wing boom 20; however, it is understood that the right-side wing boom 22 is of similar construction.

Figure 7:
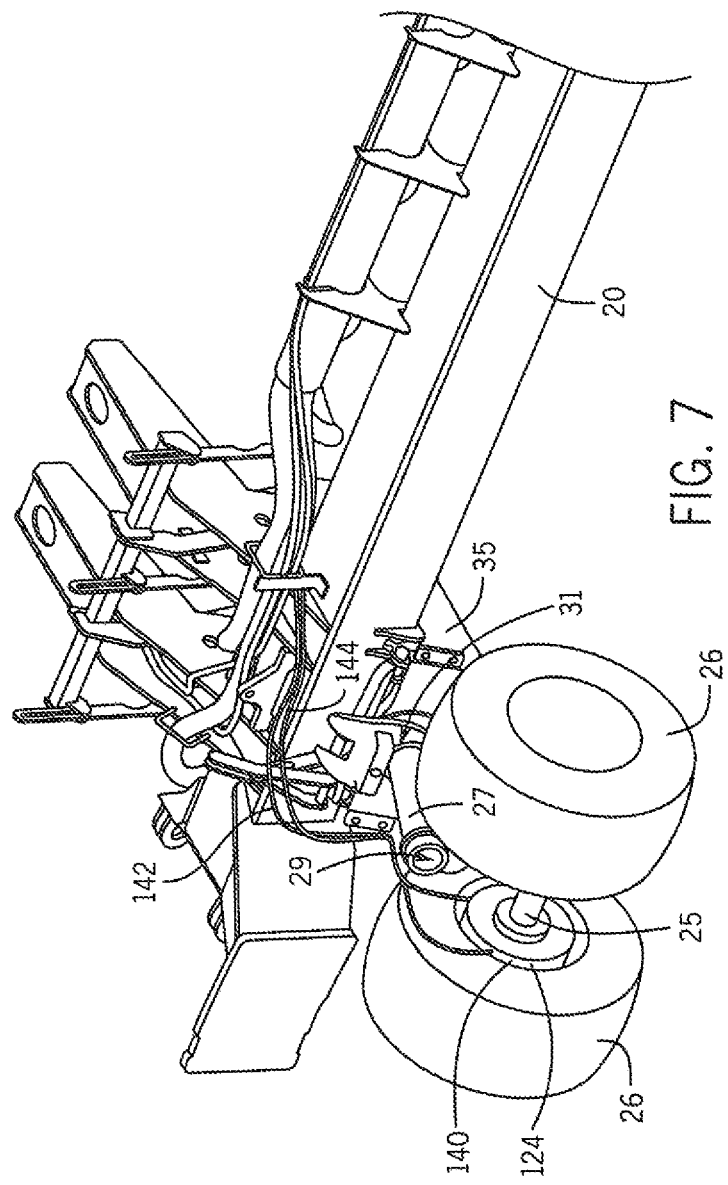
FIG. 7 is a partial isometric view of the wing wheels for the agricultural implement in a working position where the wing wheels are powered by a hydraulic motor according to one embodiment of the invention.
Figure 8:
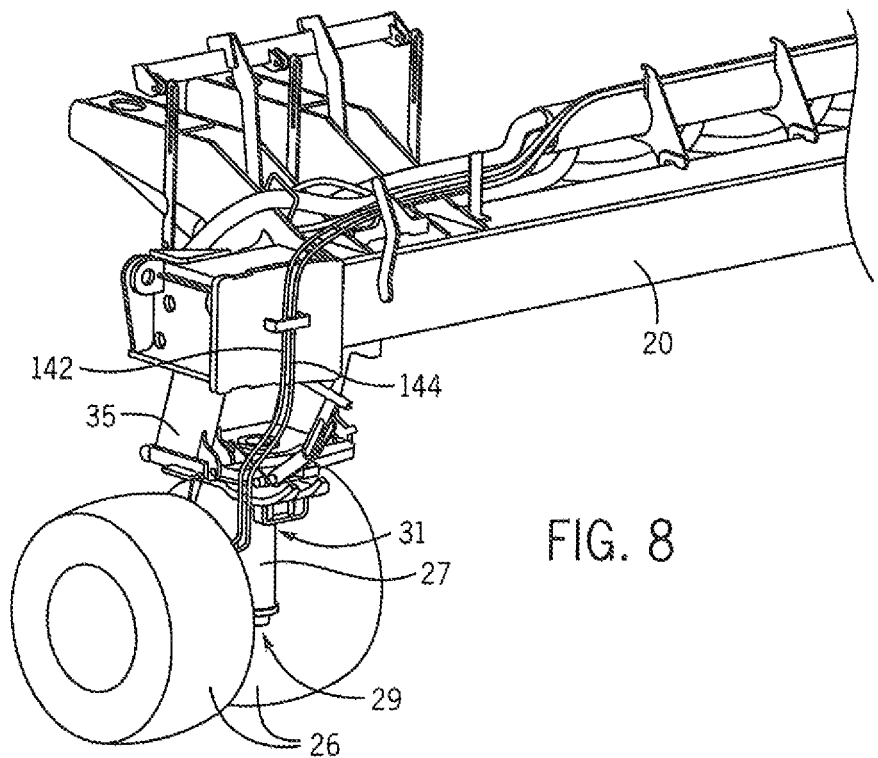
FIG. 8 is a partial isometric view of the wing wheels on the agricultural implement of FIG. 7 in a transport position.

FIG. 3 shows the wing boom 20 in its extended, working position. In this position, the wing boom 20 is generally perpendicular to the path of travel and the central axis of the hitch assembly 18. The wing boom 20 is supported above the planting surface by wing wheels 26. As will be described more fully below, the wing wheels 26 provide support for the wing boom 20 when the wing boom 20 is in its extended position and may provide support for the wing boom 20 in its retracted, transport position. Referring also to FIGS. 7 and 8, each wing wheel 26 is mounted to a wing wheel standard 27. According to the illustrated embodiment, a pair of wing wheels 26 is mounted to the wing wheel standard 27 with a first wing wheel 26 mounted on one side of the wing wheel standard 27 and a second wing wheel 26 mounted on the opposite side of the wing wheel standard 27. The wing wheels 26 are mounted at an axle 25 proximate a first end 29 of the wing wheel standard 27. The opposite end 31 of the wing wheel standard 27 is mounted to a pivotal frame member 35, where the pivotal frame member 35 is movable between a working position, as shown in FIG. 7, and a transport position, as shown in FIG. 8. In the working position, the pivotal frame member 35 lowers the wing boom 20 toward the surface allowing row units 23 to engage, or be proximate to the surface for distribution of product. In the transport position, the pivotal frame member 35 raises the wing boom 20 away from the surface such that row units 23 are clear of the surface, allowing the wing boom 20 to be extended and/or retracted. As further illustrated in FIG. 8, the second end 31 of the wing wheel standard 27 may further be configured to caster within the pivotal frame member 35, allowing the wing wheels 26 to rotate with respect to the wing boom 20 and to track the direction of travel of wing boom 20.

A draft link 30 is connected between the hitch assembly 18 and the wing boom 20 at a connection point 33 forward of the mount 24. The draft link 30 provides structural support for the wing boom 20 when the wing boom 20 is in the fully extended position. As will be described more fully below, the draft link 30 has a pair of link members 32, 34 connected to one another by a knuckle 36 that allows the link members 32, 34 to fold relative to one another when the wing boom 20 is folded forward to its transport position.

The hitch assembly 18 is supported above the planting surface by a set of carrier wheels 40, which in the illustrated embodiment includes two pairs of wheels, with a pair positioned adjacent each side of the hitch assembly 18. The hitch assembly 18 extends along a central axis of the planter 10 that is aligned with the hitch of the tractor. The carrier wheels 40 are coupled to a central wheel standard 42 that forms part of a steering/elevator assembly that is connected to the frame of the planter 10 proximate to the mount 24 for the wing boom 20. The central wheel standard 42 includes a first arm 43 and a second arm 45, each arm extending downwards and supporting an axle 47 to which the carrier wheels 40 are mounted.

The wing boom 20 has a center boom 44 that is pinned to the mount 24 at a pin 48 and an inner boom 50 that is pinned to the center boom 44 by horizontal longitudinal pin 52. The inner boom 50 is pinned to an outer boom 54 by a pin 56. The interconnection of the inner and outer booms 50, 54 allows the outer boom 54 to be lifted and folded over the inner boom 50. Pin connection 56 allows the wheel units on the inner and outer booms 50, 54 to follow surface contours and undulations. An inner actuator 57 that in one embodiment includes a hydraulic cylinder 58 is connected to the center boom 44 and a ram 60 is pinned to the mount 24 at pin 62. In addition to inner actuator 57, a draft link actuator 64 is provided that in one embodiment includes a hydraulic cylinder 66 connected to the inner boom 50 and a ram 68 connected to outer draft link member 34.

When rams 60 and 68 are fully extended, the wing boom 20 is in the fully extended position, as illustrated in FIG. 3.

However, when the rams 60 and 68 are retracted, the wing boom 20 is pulled inwardly toward the hitch assembly 18 about pin 48. FIG. 4 illustrates the wing boom 20 in a partially retracted position. More particularly, the rams 60 and 68 are retracted simultaneously until ram 68 is fully retracted. Ram 68 draws the outer link member 34 inward toward the inner boom 50 as the outer link member 34 is able to pivot relative to the inner link member 32 at knuckle 36. The ram 68 draws the outer link member 34 until the knuckle 36 abuts against the inner boom 50. With the knuckle 36 abutting the inner boom 50, the ram 60 continues to retract until the booms are adjacent and generally parallel to the hitch assembly 18, as shown in FIG. 1. As the wing boom 20 is retracted and/or extended, each of the wing wheels 26 travels in an arcuate path between the working position and the transport position where the path of each wheel along the boom 20 is concentric to the pin 48 about which the wing boom 20 pivots.

As further illustrated in FIG. 4, retraction of the wing boom 20, causes the telescoping portion 12 of the hitch assembly 18 to extend. The length of the inner link member 32 is greater than the length of the hitch assembly 18 when the telescoping portion 12 of the hitch assembly is fully retracted. Thus, as the ram 60 causes the boom 20 and the inner link member 32 to pivot towards the hitch assembly 18, the telescoping portion 12 of the hitch assembly 18 extends. In traditional planters 10, the wing wheels 26 are passive wheels and roll forward in an arcuate trajectory concentric with the travel of the end of the boom 20 as the wing boom 20 retracts and the hitch assembly 18 extends. Conversely, as the ram 60 causes the boom 20 and the inner link member 32 to pivot away from the hitch assembly 18, the telescoping portion 12 of the hitch assembly 18 retracts. The carrier wing wheels 26 roll backwards along the arcuate trajectory concentric with the travel of the end of the boom 20 as the wing boom 20 extends and the hitch assembly 18 retracts. As will be discussed in detail below, according to the embodiments of the present invention, a drive member 124 (see e.g., FIG. 6) is provided on the planter 10 to provide a driving force to the wing wheels 26 such that the wing wheels 26 may assist with extending and/or retracting the telescoping portion 12 of the hitch assembly 18 which, in turn assists with extending and/or retracting the boom 20.

Figure 5:
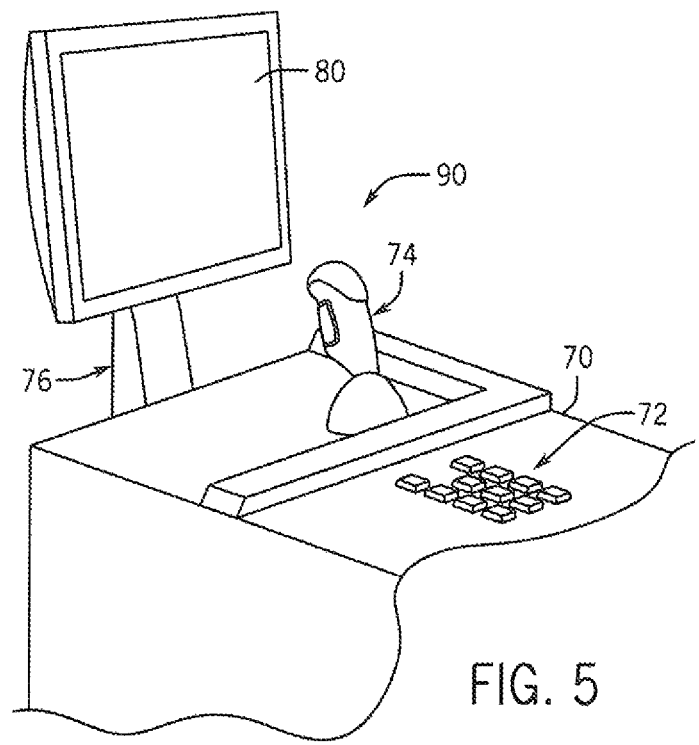
FIG. 5 is an exemplary environmental view of a controller for a towing vehicle configured to control powered wing wheels according to one embodiment of the invention.

Referring next to FIG. 5, the arm rest 70 of an exemplary towing vehicle 14 including a controller 90 incorporating the present invention is illustrated. The arm rest 70 includes various devices to receive input from the operator to control the tractor such as a panel of buttons 72 or a joystick 74. A mounting arm 76 is connected to the arm rest 10 and configured to hold a display unit 80 for the controller 90. Optionally, the controller 90 may be mounted to any suitable location within the tractor.

Figure 6:
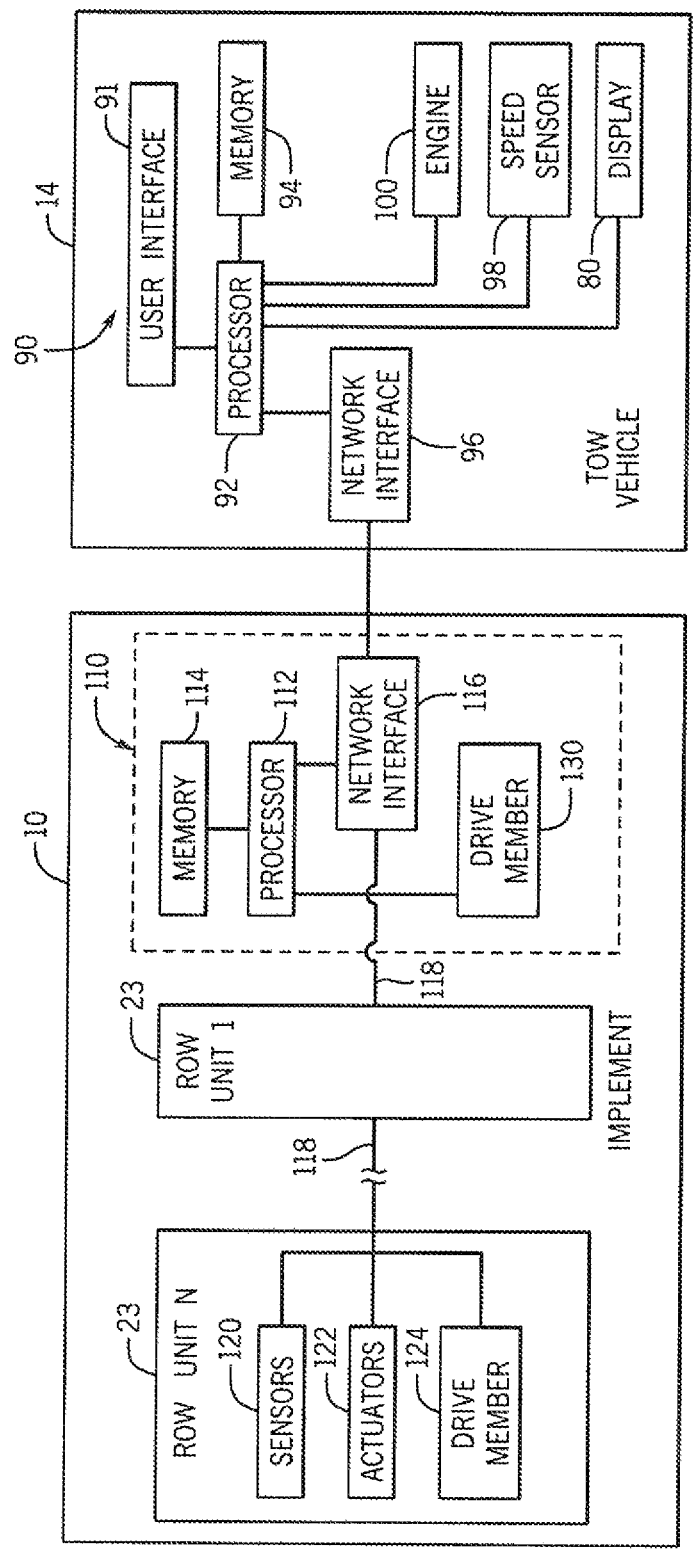
FIG. 6 is a block diagram representation of the controllers for a towing vehicle and an agricultural implement incorporating powered wing wheels according to one embodiment of the invention.

Referring also to FIG. 6, the controller 90 of the towing vehicle 14 is illustrated connected to a controller 110 on the implement 10. The towing vehicle controller 90 includes a processor 92 in communication with a memory device 94. It is contemplated that the processor 92 may be a single device or multiple devices operating in parallel or independently without deviating from the scope of the invention. Further, the processor 92 may be a microprocessor, a field programmable gate array (FPGA), application specific integrated circuit (ASIC), discrete logic devices, or any combination thereof. It is further contemplated that the memory device 94 may be a single device or multiple devices, persistent or non-persistent memory, or any combination thereof. The towing vehicle processor 92 is configured to execute one or more program nodules stored in the memory device 94. The controller 90 may also include a network interface card (NC) 96 for communications which may include, but is not limited to, a Bayonet Neill-Concelman (BNC) connector for coaxial cable, a Universal Serial Bus (USB) port, and a wireless communication (WiFi) port. According to the illustrated embodiment, the NIC 96, along with an NIC 116 on the implement, provides an interface between the towing vehicle processor 92 and the implement processor 112. The towing vehicle processor 92 is further in communication with the display unit 80 to provide a visual indication of operating status and configuration to the operator. The display unit 80 may also be a touchscreen device configured to receive input from the operator. The display unit 80, along with the panel of buttons 72 or joystick 74, previously described, or any other device configured to receive input from or provide data to an operator are part of a user interface 91 of the controller 90. The towing vehicle processor 92 may further be configured to receive feedback signals from and/or transmit control signals to mechanical systems on the towing vehicle 14, such as the engine 100, or sensors on the towing vehicle 14, such as a speed sensor 98. It is contemplated that the speed sensor 98 may be a tachometer providing an engine speed feedback signal or a wheel speed sensor providing a speed feedback signal corresponding to the rotation of a wheel.

As further illustrated in FIG. 6, the agricultural implement 10 also includes a controller 110. The implement controller 110 includes a processor 112 in communication with a memory device 114. It is contemplated that the processor 112 may be a single device or multiple devices operating in parallel or independently without deviating from the scope of the invention. Further, the processor 112 may be a microprocessor, a field programmable gate array (FPGA), application specific integrated circuit (ASIC), discrete logic devices, or any combination thereof. It is further contemplated that the memory device 114 may be a single device or multiple devices, persistent or non-persistent memory, or any combination thereof. The implement processor 112 is similarly configured to execute one or more program modules stored in the memory device 114. The implement controller 110 also includes a network interface card (NW) 116 for communications which may include, but is not limited to, a Bayonet Neill-Concelman (BNC) connector for coaxial cable, a Universal Serial Bus (USB) port, and a wireless communication (WiFi) port. As illustrated, the implement NIC 116, along with the towing vehicle NIC 96, provides an interface between the implement processor 112 and the towing vehicle processor 92. The controller 110 may also include a drive member 130 configured to provide a rotational force to one or more of the carrier wheels 40.

The implement controller 110 is further configured to communicate with each row unit 23 via appropriate network media 118. The implement 10 and/or each row unit 23 may include numerous process sensors 120 providing feedback signals to the controller 110 corresponding to various operating parameters of the implement 10 and/or each row unit 23. The controller 110 may also be configured to generate reference signals, transmitted via the network media 118 to one or more actuators 122 in each row unit 23. The actuators 122 may control operation of a pneumatic or hydraulic cylinder and may be, for example, a solenoid opening or closing a valve to supply air or hydraulic fluid to the cylinder. A sensor 120 may be a pressure sensor which detects the pressure of air or hydraulic fluid supplied to the cylinder. As will be discussed in more detail below, each row unit 23 may also include a drive member 124 configured to provide a rotational force to a wing wheel 26 either associated with or proximate to the row unit 23.

As illustrated, individual devices are connected on the network media 118 in a daisy chain configuration. It is contemplated that a star topology, individual conductors, or a combination thereof may be utilized without deviating from the scope of the invention, it is further contemplated that numerous other configurations of controllers 90, 110; memory devices 94,114; network interfaces 96, 116; and network media 118 may be implemented without deviating from the scope of the invention. For example, a single controller 90 may be provided on the towing vehicle 14 and directly communicate with the sensors 120, actuators 122, and drive member 124 on each row unit 23. According to still another embodiment, each row unit 23 may include a separate network interface 116 and controller 110.

In operation, the drive member 124 on the implement 10 is used to provide a rotational force to one or more of the wing wheels 26. By driving the wing wheels 26 forward when the wing boom 20 is retracting, the wing wheels 26 assist in retracting the telescoping portion 12 of the hitch assembly 18. Conversely, by driving the wing wheels 26 in reverse when the wing boom 20 is extending, the wing wheels, 26 assist in extending the telescoping portion 12 of the hitch assembly 18. With reference to FIGS. 3 and 4, and as previously discussed, the telescoping portion 12 of the hitch assembly 18 is coupled via the draft links 30 to each of the booms 20, 22. As a result, driving the wing wheels 26 forward and reverse assists with retracting and extending the booms 20, 22.

Referring next to FIG. 7, according to one embodiment of the invention, the drive member 124 is a hydraulic motor 140. According to the illustrated embodiment, one hydraulic motor 140 is mounted to one end of a wing wheel standard 27. An output shaft from the hydraulic motor 140 is coupled to a wheel hub to which the wing wheel 26 may be mounted. It is contemplated that the hydraulic motor 140 may include a single output shaft, extending out one side of the motor 140 to be coupled to a single wing wheel 26, or a pair of output shafts, one shaft extending out each side of the motor 140 and each shaft coupled to one of the wing wheels 26. According to still another embodiment, two hydraulic motors 140 may be mounted to the wing wheel standard 27, and each motor 140 may be configured to drive one of the wing wheels 26 on the wing wheel standard 27. Each hydraulic motor includes a supply line 142 and a return line 144 through which the hydraulic fluid is provided to and returned from the hydraulic motor 140. It is contemplated that various configurations of hydraulic motors 140 may be utilized on a planter 10 as required by the planter configuration, including, but not limited to, the number or row units 23, the rated capacity of the hoppers 21, or the size of the rains 60, 68 coupled to the draft links 30.

Figure 9:
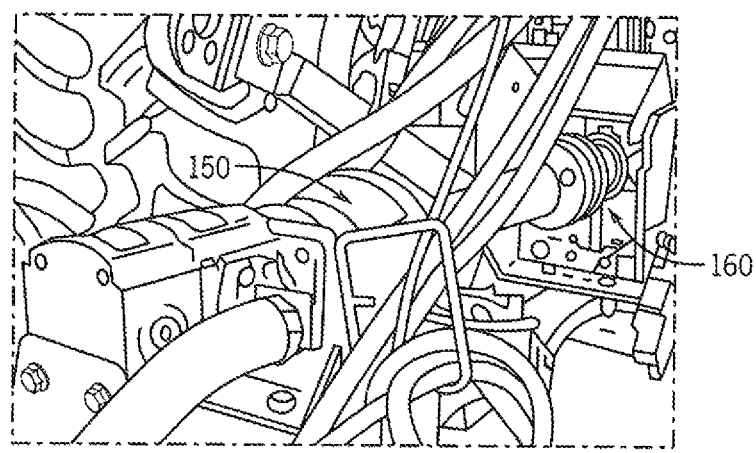
FIG. 9 is a partial isometric view of an agricultural implement including a hydraulic pump configured to supply fluid to a hydraulic motor.

Referring also to FIG. 9, a hydraulic pump 150 may be mounted to the planter 10 to supply hydraulic fluid to each hydraulic motor 140. The hydraulic pump 150 is driven by a power takeoff (PTO) 160 connected to the towing vehicle 14. The towing vehicle controller 90 may determine when to engage the PTO 160 with the engine and/or transmission of the towing vehicle 14, for example, via a manual or automatic clutch and/or transmission. The towing vehicle controller 90 may also determine a rate at which the PTO 160 is to rotate and, in turn, the rate at which the pump 150 supplies fluid to each hydraulic motor 140. Optionally, the controller 110 on the planter 10 may generate the commands to control the PTO and the pump 150. It is contemplated that the planter 10 may utilize a hydraulic pump 150 which already exists on the planter 10 or an auxiliary pump may be provided on the planter 10 to supply the hydraulic motors 140. Optionally, the PTO may be engaged and disengaged to drive the hydraulic pump and a series of hydraulic valves may control distribution of the hydraulic fluid to the hydraulic motor. One or more hydraulic valves are provided on the planter 10 to enable and/or disable the flow of the hydraulic fluid between the hydraulic pump 150 and each hydraulic motor 140. Optionally, the valve may be a variable valve, receiving, for example, an analog voltage or a message packet via the network medium 118 providing a reference signal to the variable valve. The variable valve is configured to open some percentage between zero percent, fully closed, and one hundred percent, fully open, to regulate the amount of fluid flowing to the hydraulic motor 140 as a function of the analog voltage or of a percentage contained in the message packet. The analog voltage or the message packet is generated by one of the controllers 90, 110 and transmitted to the valve. In addition, a bypass valve or flow path may be provided to allow the hydraulic fluid to re-circulate through the hydraulic pump when the valve to the hydraulic motor is either not open or not fully open.

Figure 10:
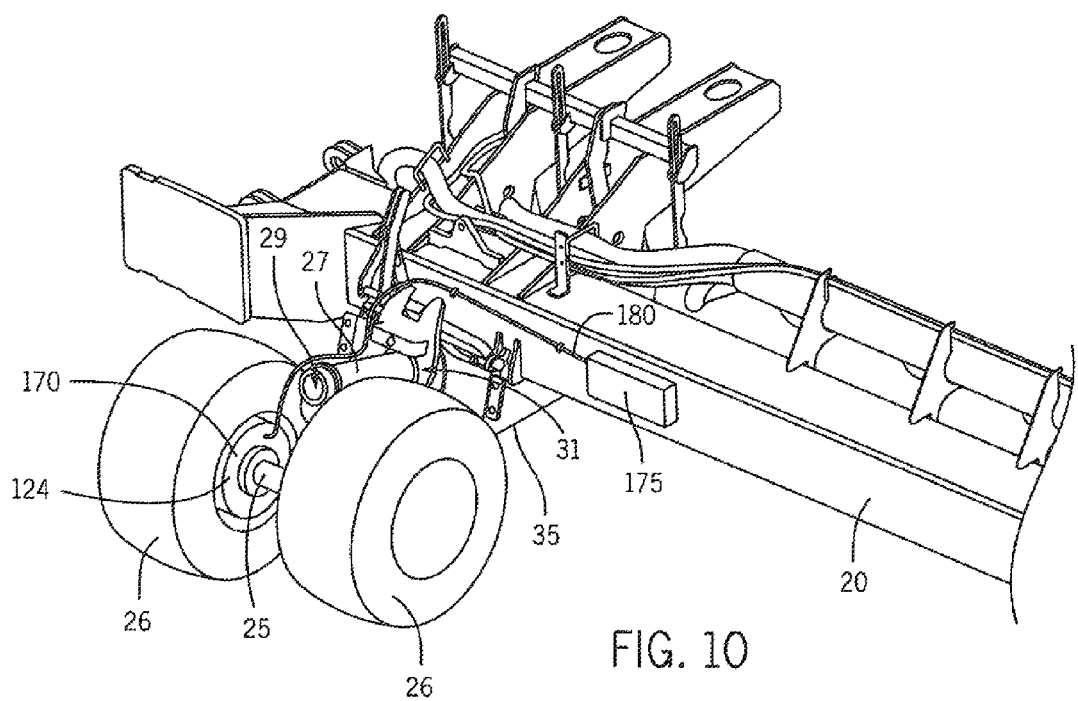
FIG. 10 is a partial isometric view of the wing wheels for the agricultural implement where the wing wheels are powered by an electric motor according to another embodiment of the invention.

Referring next to FIG. 10, according to another embodiment of the invention, the drive member 124 is an electric motor 170. According to the illustrated embodiment, one electric motor 170 is mounted one end of a wing wheel standard 27. An output shaft from the electric motor 170 is coupled to a wheel hub to which the wing wheel 26 may be mounted. It is contemplated that the electric motor 170 may include a single output shaft, extending out one side of the motor 170 to be coupled to a single wing wheel 26 or a pair of output shafts, one shaft extending out each side of the motor 170 and each shaft coupled to one of the wing wheels 26. According to still another embodiment, a separate electric motor 170 may be mounted to each side of the wing wheel standard 27, and each motor 170 may be configured to drive a single wing wheel 26. It is contemplated that various configurations of electric motors 170 may be utilized on a planter 10 as required by the planter configuration, including, but not limited to, the number of row units 23, the rated capacity of the hoppers 21, or the size of the rams 60, 68 coupled to the draft links 30.

A motor drive 175 may also be mounted to the planter 10 to deliver power to each electric motor 170. The motor drive 175 may receive power from a battery, or a series of batteries, also mounted to the planter 10. An inverter section in the motor drive 175 converts the power drawn from the batteries to a suitable voltage for controlling operation of the electric motor 170. As illustrated, a cable 180 is connected between the motor drive 175 and the electric motor 170. It is contemplated that the cable may be a bundle of electrical conductors contained within a single jacket, multiple conductors run separately, or a combination thereof. The cable 180 provides power from the output of the inverter section of the motor drive 175 to the electric motor 170 and may similarly provide feedback signals, such as voltage, current, speed, and/or position of the motor 170 to the motor drive 175. The motor drive 175 may receive a command for operation of the electric motor 170 from the towing vehicle controller 90 or the implement controller 110. The command may indicate a desired speed of or torque applied to, the wing wheel 26.

When an operator of the towing vehicle 14 wishes to switch the planter between the transport position and the working position, a command is entered by the operator via the user interface 91. The controller 90 generates a command signal transmitted to the implement controller 110 to instruct the planter to switch between positions. The implement controller 110 generates further command signals to coordinate operation of the hydraulic cylinders 58, 66 on each boom 20, 22 with operation of each drive member 124 connected to a wing wheel 26. The drive member 124 drives the wing wheels 26 forward or reverse in coordination with retracting/extending of the rams 60, 68 such that less force is required by each ram 60, 68 to retract/extend the booms 20, 22. Similarly, the force applied to each draft link 30 is also reduced for a comparably sized boom 20, 22. Consequently, less wear occurs to the components of each boom 20, 22 and/or components, such as the hydraulic cylinders 58, 66 or draft link 30 may be a smaller size, reducing weight and cost of the boom 20, 22. Optionally, the addition of the drive member 124 may allow the length of the boom 20, 22 to be increased with comparable boom components, thereby increasing planting efficiency. Although the above described embodiment assigns certain tasks to specific controllers 90, 110, it is contemplated that various steps performed to switch the planter between the transport position and the working position may be accomplished by either of the controllers 90, 110 without deviating from the scope of the invention.

It is further contemplated that the drive member 124 may provide improved maneuverability of the planter 10 during operation. According to one aspect of the invention, the implement controller 110 may enable the drive member 124 to assist the tractive effort of the towing vehicle 14. The increasing size of the planters 10 corresponds to an increase in the weight of the planters. Further, the increasing length of the wing booms 20, 22 acts as a longer lever anti to forces applied to and/or encountered at the ends of the wing booms 20, 22. The increasing weight of the planter 10 and the increasing length of the wing booms 20, 22 each requires a greater force applied to the hitch assembly to overcome said force. Absent an additional source of applied force, the driven wheels of the towing vehicle 14 are required to apply a correspondingly increasing force to the surface to pull the planter 10 during operation.

Either the towing vehicle controller 90 or the implement controller 110 may receive one or more feedback signals corresponding to operation of the towing vehicle 14 and/or the implement 10. The feedback signals may correspond, for example, to a speed of travel of the towing vehicle 14 or to wheel slippage of a driven wheel on the towing vehicle 14. It is understood that the speed of travel may be derived from other feedback signals, such as a wheel speed sensor, a wheel position sensor, and/or a tachometer measuring the engine speed. Similarly, wheel slippage may be detected by a sudden acceleration or change in wheel speed. One of the controllers 90, 110 is configured to receive the feedback signals and generate a reference signal to the drive member 124. The reference signal may correspond, for example, to a desired speed of the wing wheel 26 driven by the drive member 124. The first feedback signal, corresponding to a desired travel speed (e.g., the speed of the towing vehicle 14), may be compared to a second feedback signal corresponding to the wing wheel speed. The reference signal may be adjusted to increase or decrease the driving force provided to the wing wheel 26 such that the wing wheel 26 is moving at the same speed as the towing vehicle 14. Optionally, the feedback signal may correspond to wheel slippage.

Further, it is contemplated that the drive member 124 may be enabled and/or disabled either manually or automatically to provide the driving force to the wing wheel 26. An operator in the towing vehicle 14 may manually enter a command via the user interface 91 to enable and/or disable the drive member 124. Optionally, the drive member may be enabled automatically, for example, when wheel slippage is detected by an acceleration of a driven wheel that exceeds a predefined threshold. The controller 110 may determine that the towing vehicle 14 and planter 10 requires additional tractive force and enable the drive member 124 for a predefined duration. During the predefined duration, the controller 110 may monitor operating conditions. If, for example, additional wheel slippage is detected within the duration, the duration may be reset and/or extended such that the drive member 124 continues providing the additional force to drive the wing wheel 26. If no further slippage is detected, the controller 110 may disable the drive member 124, allowing the planter 10 to again be pulled solely by the towing vehicle 14.

It is further contemplated that the additional tractive force provided by the drive member 124 to the wing wheel 26 may only be needed on an intermittent basis, for example, in a muddy section of a field or on an incline. The drive member 124 may be configured to operate in two modes. In a first operating mode, the drive member 124 provides the desired driving force to the wing wheel 26 to provide the additional tractive force required. In the second operating mode, the drive member 124 may be disabled or de-enemized and allowed to "freewheel." When the drive member 124 is freewheeling, it neither aids nor inhibits rotation of the wing wheel 26 but rather allows the wing wheel 26 to rotate responsive to the tractive force applied to the hitch assembly 18 by the towing vehicle 14.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An agricultural planter assembly configured to be pulled along a surface by a towing vehicle, comprising:
   a hitch assembly having a first end, a second end, and a telescoping portion, wherein:
   the first end is configured to be located proximate to the towing vehicle,
   the second end is configured to be located distal from the towing vehicle, and
   the telescoping portion is movable between an extended position and a retracted position;
   at least one wing boom having a first end and a second end, each wing boom pivotally connected to the hitch assembly at the first end and movable between a working position and a transport position;
   at least one draft link, each draft link connected between the hitch assembly and one of the wing booms;
   at least one wing wheel mounted proximate to the second end of each wing boom and configured to engage the surface;
   at least one drive member operatively coupled and providing a driving force to each wing wheel, wherein the drive member provides the driving force when the at least one wing boom is being moved between the working position and the transport position;

at least one hydraulic cylinder connected between the hitch assembly and one of the wing boom and the draft link, wherein each hydraulic cylinder is movable between a retracted position and an extended position and wherein movement of the hydraulic cylinder between the retracted position and the extended position causes, at least in part, the wing boom to move between the working position and the transport position; and a controller configured to:
generate a first control signal to the at least one hydraulic cylinder to move the hydraulic cylinder between the retracted position and the extended position,
generate a second control signal to the drive member corresponding to a desired driving force, and
coordinate the first and second control signals such that the at least one hydraulic cylinder and the drive member operate in tandem to move the wing boom between the working position and the transport position,
wherein the drive member receives a command signal from the towing vehicle to provide the driving force when the at least one wing boom is in the working position, and
wherein the command signal is a speed signal corresponding to a speed of the towing vehicle, the agricultural planter assembly further comprising a speed sensor generating a signal corresponding to a speed of the wing wheel, wherein the drive member generates the driving force such that the speed of the wing wheel matches the speed of the towing vehicle.

2. The agricultural planter assembly of claim 1 wherein the drive member is a hydraulic motor.

3. The agricultural planter assembly of claim 1, wherein the drive member is an electric motor and the agricultural planter assembly further comprises a motor drive configured to receive a command signal from the controller and configured to control rotation of the electric motor responsive to the command signal.

4. The agricultural planter assembly of claim 1 wherein the drive member is operable in a first mode to provide the desired driving force and in a second mode wherein each wing wheel to which the drive member provides the desired driving force is allowed to freewheel.

5. An agricultural planter assembly configured to be pulled along a surface by a towing vehicle, comprising:
a hitch assembly configured to removably couple the agricultural planter assembly to the towing vehicle;
at least one elongated boom having a first end and a second end, wherein the first end is pivotally coupled to the hitch assembly and each elongated boom is movable between a working position and a transport position;
at least one wing wheel mounted to the second end of each elongated boom, each wing wheel configured to engage the surface;
a drive member operatively coupled and providing a driving force to each wing wheel;
at least one sensor configured to generate a signal corresponding to an operating parameter of one of the towing vehicle and the agricultural planter; and
a controller configured to receive the signal from the at least one sensor and to generate a reference signal for the drive member, wherein the reference signal corresponds to a desired driving force,
wherein the drive member provides the desired driving force to the wing wheel when the elongated boom is in the working position, and
the at least one sensor on the agricultural planter assembly generates a signal corresponding to a speed of the driven wing wheel on the agricultural planter assembly,
the controller is configured to receive a signal corresponding to a speed of the towing vehicle, and
the desired driving force generated by the controller is generated such that the speed of the wing wheel matches the speed of the towing vehicle.

6. The agricultural planter assembly of claim 5, wherein:
the hitch assembly includes a telescoping portion movable between an extended position and a retracted position,
the telescoping portion moves between the extended position and the retracted position when the elongated boom moves between the transport position and the working position, and
the drive member provides the desired driving force to the wing wheel when the elongated boom is moved between the transport position and the working position.

7. The agricultural planter assembly of claim 6 further comprising at least one hydraulic cylinder connected between the hitch assembly and each elongated boom, wherein each hydraulic cylinder is movable between a retracted position and an extended position and wherein movement of the hydraulic cylinder between the retracted position and the extended position causes, at least in part, the corresponding elongated boom to move between the working position and the transport position; and
a controller configured to:
generate a first control signal to the at least one hydraulic cylinder to move the hydraulic cylinder between the retracted position and the extended position,
generate a second control signal to the drive member corresponding to the desired driving force, and
coordinate the first and second control signals such that the at least one hydraulic cylinder and the drive member operate in tandem to move the elongated boom between the working position and the transport position.

8. The agricultural planter assembly of claim 5 wherein the drive member is operable in a first mode to provide the desired driving force and in a second mode wherein the wing wheel to which the drive member provides the desired driving force is allowed to freewheel.

9. The agricultural planter assembly of claim 5 wherein:
the controller is configured to receive a wheel slip signal corresponding to a magnitude of slip of a driven wheel on the towing vehicle, and
the controller commands the drive member to provide the driving force when the wheel slip signal exceeds a predefined threshold.

10. In an agricultural planter assembly, configured to be pulled along a surface by a towing vehicle, the agricultural planter assembly having:
a hitch assembly configured to removably couple the agricultural planter assembly to the towing vehicle;
at least one elongated boom having a first end and a second end, wherein the first end is pivotally coupled to the hitch assembly and each elongated boom is movable between a working position and a transport position;
at least one wing wheel mounted to the second end of each elongated boom, each wing wheel configured to engage the surface, the improvement comprising:

a drive member operatively coupled and providing a driving force to each wing wheel, wherein the drive member provides the desired driving force to the wing wheel when the elongated boom is in the working position;

at least one sensor configured to generate a signal corresponding to an operating parameter of one of the towing vehicle and the agricultural planter; and a controller configured to receive the signal from the at least one sensor and to generate a reference signal for the drive member, wherein the reference signal corresponds to a desired driving force, wherein the controller is configured to receive a wheel slip signal corresponding to a magnitude of slip of a driven wheel on the towing vehicle, and the controller commands the drive member to provide the driving force when the wheel slip signal exceeds a predefined threshold.

11. The agricultural planter assembly of claim 10, wherein:

the hitch assembly includes a telescoping portion movable between an extended position and a retracted position, the telescoping portion moves between the extended position and the retracted position when the elongated boom moves between the transport position and the working position, and the drive member provides the desired driving force to the wing wheel when the elongated boom is moved between the transport position and the working position.

12. The agricultural planter assembly of claim 11 further comprising at least one hydraulic cylinder connected between the hitch assembly and each elongated boom wherein each hydraulic cylinder is movable between a retracted position and an extended position and wherein movement of the hydraulic cylinder between the retracted position and the extended position causes, at least in part, the corresponding elongated boom to move between the working position and the transport position; and a controller configured to:

generate a first control signal to the at least one hydraulic cylinder to move the hydraulic cylinder between the retracted position and the extended position, generate a second control signal to the drive member corresponding to the desired driving force, and coordinate the first and second control signals such that the at least one hydraulic cylinder and the drive member operate in tandem to move the elongated boom between the working position and the transport position.

13. The agricultural planter assembly of claim 10 wherein the drive member is operable in a first mode to provide the desired driving force and in a second mode wherein the wing wheel to which the drive member provides the desired driving force is allowed to freewheel.

14. The agricultural planter assembly of claim 10 wherein:

the at least one sensor on the agricultural planter assembly generates a signal corresponding to a speed of the driven wing wheel on the agricultural planter assembly, the controller is configured to receive a signal corresponding to a speed of the towing vehicle, and the desired driving force generated by the controller is generated such that the speed of the wing wheel matches the speed of the towing vehicle.

* * * * *